US012784622B2

(12) United States Patent
Lee et al.

(10) Patent No.: US 12,784,622 B2
(45) Date of Patent: Nov. 3, 2026

(54) DISPLAY DEVICE AND METHOD FOR DETECTING A DEFECT THEREOF

(71) Applicant: SAMSUNG DISPLAY CO., LTD., Yongin-si (KR)

(72) Inventors: Kwang Sae Lee, Asan-si (KR); Jung Hoon Shim, Asan-si (KR); Won Kyu Kwak, Seongnam-si (KR); Ki Myeong Eom, Suwon-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 148 days.

(21) Appl. No.: 18/953,531

(22) Filed: Nov. 20, 2024

(65) Prior Publication Data

US 2025/0078706 A1 Mar. 6, 2025

Related U.S. Application Data

(60) Division of application No. 18/342,329, filed on Jun. 27, 2023, now abandoned, which is a continuation of
(Continued)

(30) Foreign Application Priority Data

May 16, 2017 (KR) ........................ 10-2017-0060474

(51) Int. Cl.
*G09G 3/00* (2006.01)
*G09G 3/20* (2006.01)

(52) U.S. Cl.
CPC ............... *G09G 3/006* (2013.01); *G09G 3/20* (2013.01); *G09G 2300/0426* (2013.01); *G09G 2330/12* (2013.01)

(58) Field of Classification Search
CPC .... G01R 31/50; G01R 31/02; G01R 31/2805; G01R 31/024; G01R 31/2812;
(Continued)

(56) References Cited

U.S. PATENT DOCUMENTS 9,489,065 B2 11/2016 Bae
11,195,440 B2 * 12/2021 Lee .......................... G09G 3/20
(Continued)

FOREIGN PATENT DOCUMENTS

CN 103578398 2/2014
KR 1020150136999 12/2015

OTHER PUBLICATIONS

Office Action dated Feb. 29, 2024 in corresponding U.S. Appl. No. 18/342,329.
(Continued)

*Primary Examiner* — Eman A Alkafawi
*Assistant Examiner* — Suresh K Rajaputra
(74) *Attorney, Agent, or Firm* — F. CHAU & ASSOCIATES, LLC

(57) ABSTRACT

A display device includes a display panel having a display area and a peripheral area. The display device includes a circuit having a comparator, and first and second sense wires disposed in the peripheral area and connected to the circuit. The comparator compares a first output signal output from the first sense wire and a second output signal output from the second sense wire to generate a comparison result. The circuit determines whether a defect is present in the display device based on the comparison result.

18 Claims, 14 Drawing Sheets

Related U.S. Application Data application No. 17/575,109, filed on Jan. 13, 2022, now Pat. No. 11,727,836, which is a continuation of application No. 15/979,786, filed on May 15, 2018, now Pat. No. 11,227,518.

(58) Field of Classification Search
CPC ............ G01R 31/2884; G01R 31/2853; G09G 2300/0426; G09G 2330/12; G09G 3/20; G09G 3/00
See application file for complete search history.

(56) References Cited

U.S. PATENT DOCUMENTS

| | | | | |
|---|---|---|---|---|
| 11,227,518 | B2 * | 1/2022 | Lee | G09G 3/006 |
| 11,727,836 | B2 * | 8/2023 | Lee | G09G 3/006 324/537 |
| 2011/0037744 | A1 | 2/2011 | Oh | |
| 2011/0175800 | A1 | 7/2011 | Mizumaki | |
| 2013/0082843 | A1 | 4/2013 | Wurzel et al. | |
| 2013/0083457 | A1 | 4/2013 | Wurzel et al. | |
| 2014/0028650 | A1 | 1/2014 | Bae | |
| 2014/0085290 | A1 | 3/2014 | Yu | |
| 2014/0176844 | A1 | 6/2014 | Yanagisawa | |
| 2016/0162085 | A1 | 6/2016 | Kim | |
| 2016/0260367 | A1 | 9/2016 | Kwak et al. | |
| 2018/0053466 | A1 | 2/2018 | Zhang et al. | |
| 2018/0336808 | A1 | 11/2018 | Lee et al. | |
| 2018/0342185 | A1 | 11/2018 | Lee et al. | |
| 2022/0139280 | A1 | 5/2022 | Lee et al. | |
| 2023/0343259 | A1 | 10/2023 | Lee et al. | |

OTHER PUBLICATIONS

Final Office Action dated Dec. 28, 2020 in corresponding U.S. Appl. No. 15/979,786.
Notice of Allowance dated Sep. 21, 2021 in corresponding U.S. Appl. No. 15/979,786.
Notice of Allowance dated Mar. 27, 2023 in corresponding U.S. Appl. No. 17/575,109.
Office Action dated Apr. 13, 2021 in corresponding U.S. Appl. No. 15/979,786.
Office Action dated Jun. 11, 2020 in corresponding U.S. Appl. No. 15/979,786.
Office Action dated Nov. 2, 2022, of the corresponding Chinese Patent Application No. 201810469503.1.

* cited by examiner

DISPLAY DEVICE AND METHOD FOR DETECTING A DEFECT THEREOF

CROSS-REFERENCE TO RELATED APPLICATION

This application is a divisional of U.S. patent application Ser. No. 18/342,329 filed Jun. 27, 2023, which is a continuation application of U.S. patent application Ser. No. 17/575,109 filed Jan. 13, 2022, issued as U.S. Pat. No. 11,727,836 on Aug. 15, 2023, which is a continuation application of U.S. patent application Ser. No. 15/979,786 filed May 15, 2018, issued as U.S. Pat. No. 11,227,518 on Jan. 18, 2022, which claims priority to and the benefit of Korean Patent Application No. 10-2017-0060474 filed in the Korean Intellectual Property Office on May 16, 2017, the disclosures of which are incorporated by reference herein.

BACKGROUND

(a) Technical Field

The present disclosure relates to a display device and a method for inspecting a defect of the display device.

(b) Discussion of Related Art

A display device such as a liquid crystal display (LCD) or an organic light emitting diode (OLED) display includes a display panel having a plurality of pixels for displaying an image, and a plurality of signal lines. Each pixel includes a pixel electrode that receives a data signal, and the pixel electrode may receive a data signal by being connected with at least one transistor. The display panel may include a plurality of layers stacked onto a substrate.

A crack may occur in the substrate or the layers when an impact is applied to the display panel. The crack may grow over time or spread to other layers or other areas such that a display panel defect occurs. For example, a crack may occur in a signal line such as a data line or a scan line, which results in a short circuit of the signal line or an increase in resistance of the signal line. Further, the crack may allow moisture to permeate into the display panel. Thus, the crack can cause elements within the display device to deteriorate. This deterioration could prevent the pixels from emitting light or cause the pixel to erroneously emit light.

A display device with a flexible display is particularly vulnerable to these cracks. For example, even when a minute crack occurs in the substrate or one of the layers of the display panel, the crack may grow very large as time passes due to twisting or bending of the display panel.

SUMMARY

At least one embodiment of the present invention has been made in an effort to provide a display device that enables a defect such as a crack to be detected more easily, and a method for detecting the defect.

A display device according to an exemplary embodiment of the invention includes a display panel having a display area where an image is displayed and a peripheral area disposed outside the display area. The display device includes a circuit having a comparator, a first sense wire and a second sense wire that are disposed in the peripheral area and connected to the circuit, where the comparator compares a first output signal output from the first sense wire and a second output signal output from the second sense wire to generate a comparison result, and the circuit determines whether a defect is present in the display device based on the comparison result.

The second sense wire may include a portion that extends in parallel with the first sense wire, and the second sense wire may be disposed between the first sense wire and the display area in the peripheral area.

A length of the second sense wire may be shorter than a length of the first sense wire.

Opposite ends of at least one of the first sense wire and the second sense wire may be connected to the circuit, and each of the first sense wire and the second sense wire may include a wire that extends back and forth at least once in the peripheral area.

In an embodiment, a number of meandering paths of a meandering structure included in the second sense wire may be smaller than a number of meandering paths of a meandering structure included in the first sense wire.

The circuit may be configured to apply a weight value to compensate a difference between a resistance of the first sense wire and a resistance of the second sense wire.

Opposite ends of each of the first and second sense wires may be connected to different sides of the circuit, and each of the first and second sense wires may include a portion extending along at least three sides of the display area.

Opposite ends of the first sense wire may be connected to a same side of the circuit, and opposite ends of the second sense wire may be connected to a same side of the circuit.

The first sense wire may include two portions that are disposed symmetrically to each other with respect to the display area while being separated from each other.

The first sense wire and the second sense wire may be disposed on a same layer in a sectional view.

The display panel may further include a third sense wire that is disposed in the peripheral area and is connected to the circuit, the first sense wire and the second sense wire may be disposed in the peripheral area on a second side of the display area that opposes the first side, the third sense wire may be disposed in the peripheral area on a side that faces the first sense wire with reference to the display area, and the comparator may include a first comparator that compares a resistance of the first sense wire and a resistance of the second sense wire and a second comparator that compares a resistance of the first sense wire and a resistance of the third sense wire.

The first sense wire and the second sense wire may be disposed at opposite sides of the display area.

According to an exemplary embodiment of the invention, a display device includes a display panel having a display area where an image is displayed and a peripheral area disposed outside the display area. The display device includes a circuit having a resistance detector and a sense wire including a first portion connected to a first side of the circuit and located on a first side of the peripheral area, a second portion connected to the first portion and located on a top side of the peripheral area, and a third portion connected to the second portion and a second side of the circuit, wherein the third portion is located on a second side of the peripheral area that opposes the first side. The circuit applies an input signal to the first portion. The resistance detector detects a resistance of the sense wire based on the output signal received through the third portion in response to the input signal. The circuit determines whether a defect is present in the display device when the resistance is outside a pre-defined threshold.

In an embodiment, the first portion and the third portion extend along a first direction, the second portion extends along a second direction, and the first direction is perpendicular to the second direction.

In an embodiment, the resistance detector includes an analog to digital converter for converting the detected resistance into a digital value.

According to an exemplary embodiment of the invention, a method for detecting a defect in a display device is provided. The display device includes a display panel including a display area and a peripheral area disposed outside the display area, the display device including a circuit, a first sense wire disposed in the peripheral area and connected to the circuit and a second sense wire disposed in the peripheral area and connected to the circuit. The method includes: the circuit applying a first input signal to the first sense wire; the circuit applying a second input signal to the second sense wire; the circuit measuring a first resistance of the first sense wire using a first output signal generated by the first sense wire in response to the first input signal; the circuit measuring a second resistance of the second sense wire using a second output signal generated by the second sense wire in response to the second input signal; and the circuit determining whether the display device has a defect based on comparing the first resistance and the second resistance with each other.

The determining of the defect may include determining whether both the first resistance and the second resistance are included in a first predetermined range.

The determining of the defect may further include determining whether a difference between the first resistance and the second resistance is included in a second predetermined range.

The second predetermined range may be a range within about ±15% with respect to a center value.

The method may further include applying a weight value to one of the resistances prior to determining the difference when lengths of the sense wires differ from one another.

According to exemplary embodiments of the present disclosure, accuracy in detection of a defect such as a crack in a display panel can be increased to prevent erroneous detection of a defect and acquire detailed information on progression of the crack. Particularly, without regard to wire width deviation due to process distribution in a manufacturing process, a defect such as a crack in the display panel can be accurately detected.

DETAILED DESCRIPTION OF THE EXEMPLARY EMBODIMENTS

Figure 1:
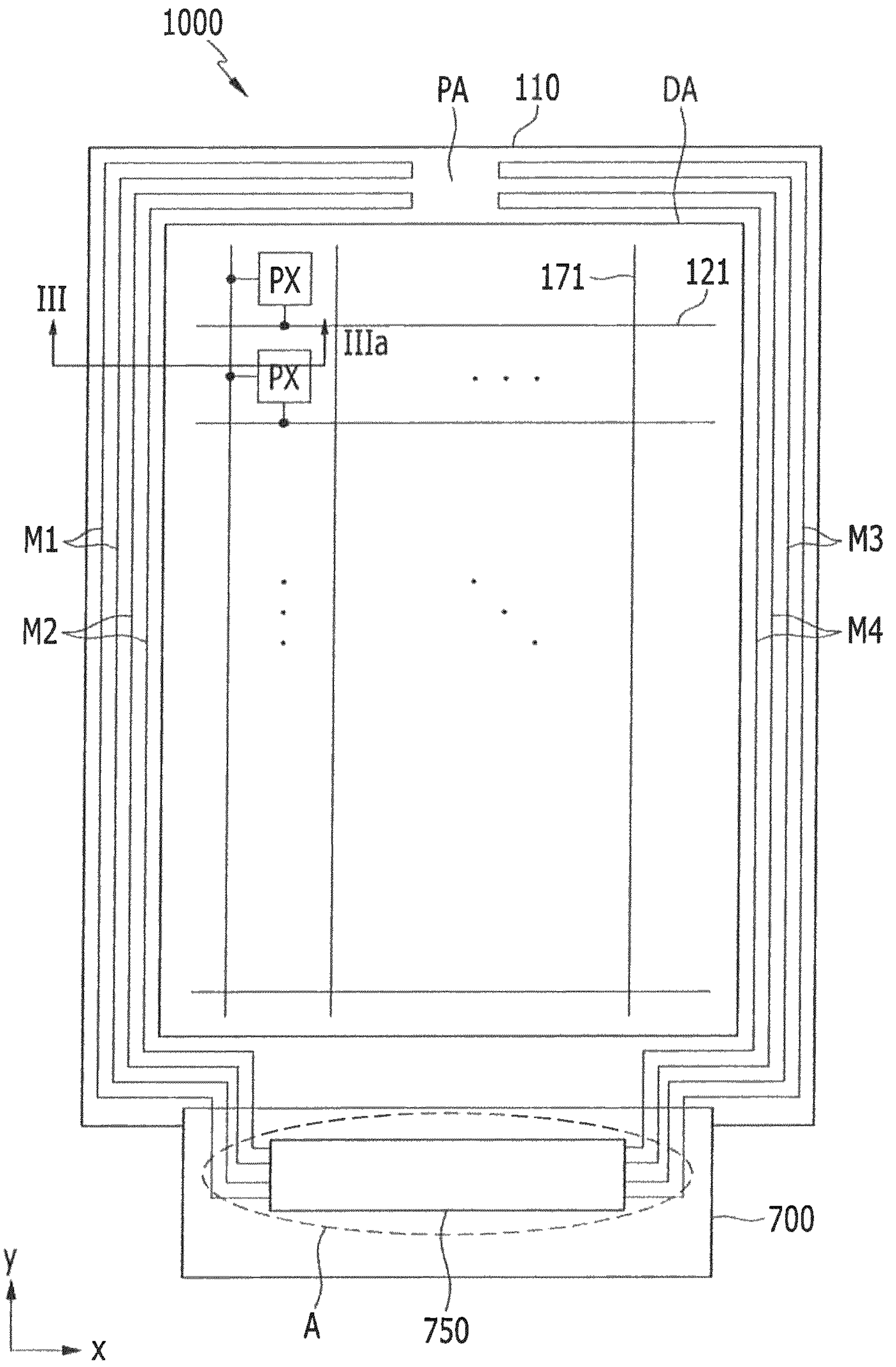
FIG. 1 is a layout view of a display device according to an exemplary embodiment of the inventive concept.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Like reference numerals designate like elements throughout the specification. It will be understood that when an element such as a layer, film, region, or substrate is referred to as being "on" another element, it can be directly on the other element or intervening elements may also be present.

A display device according to an exemplary embodiment of the inventive concept will now be described with reference to FIG. 1 to FIG. 5.

Figure 4:
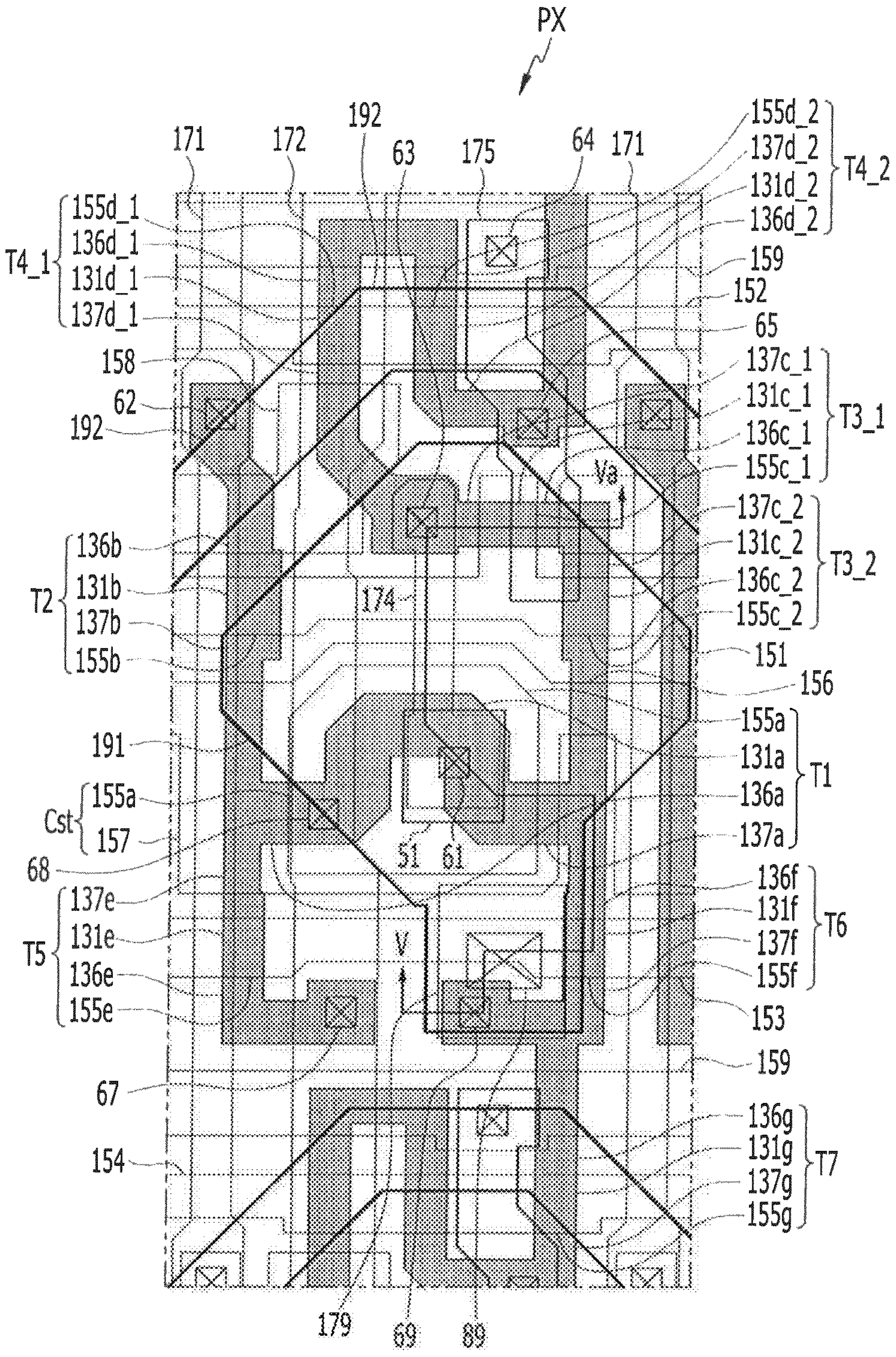
FIG. 4 is a layout view of a pixel of the display device according to an exemplary embodiment of the inventive concept.
Figure 5:
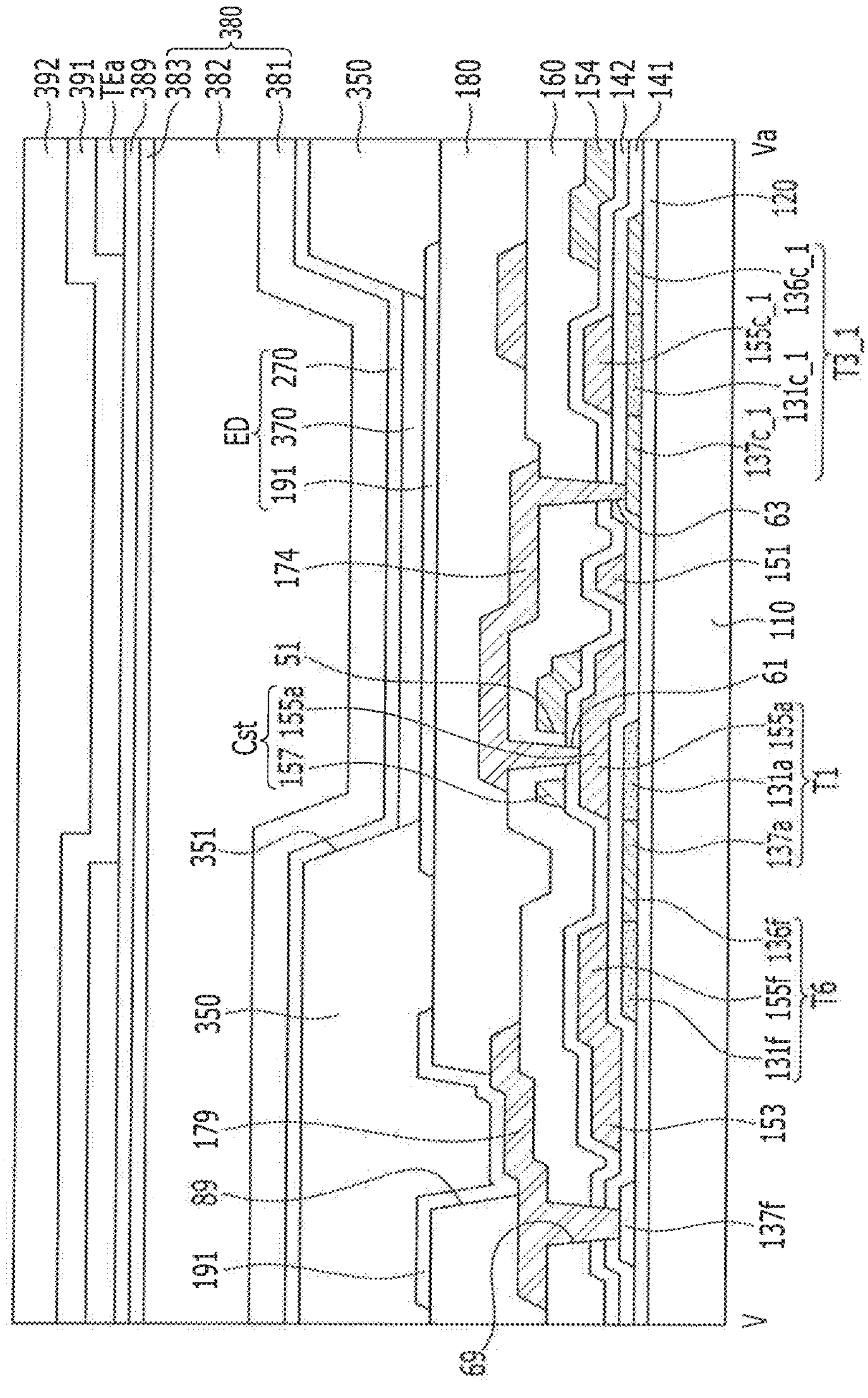
FIG. 5 is a cross-sectional view of the display device of FIG. 4, taken along line V-Va.

A plane structure of the display device will be described with reference to FIG. 1 and FIG. 2, a cross-sectional structure of the display device will be described with reference to FIG. 3, and an example of a detailed structure of a pixel will be described with reference to FIG. 4 and FIG. 5.

Figure 2:
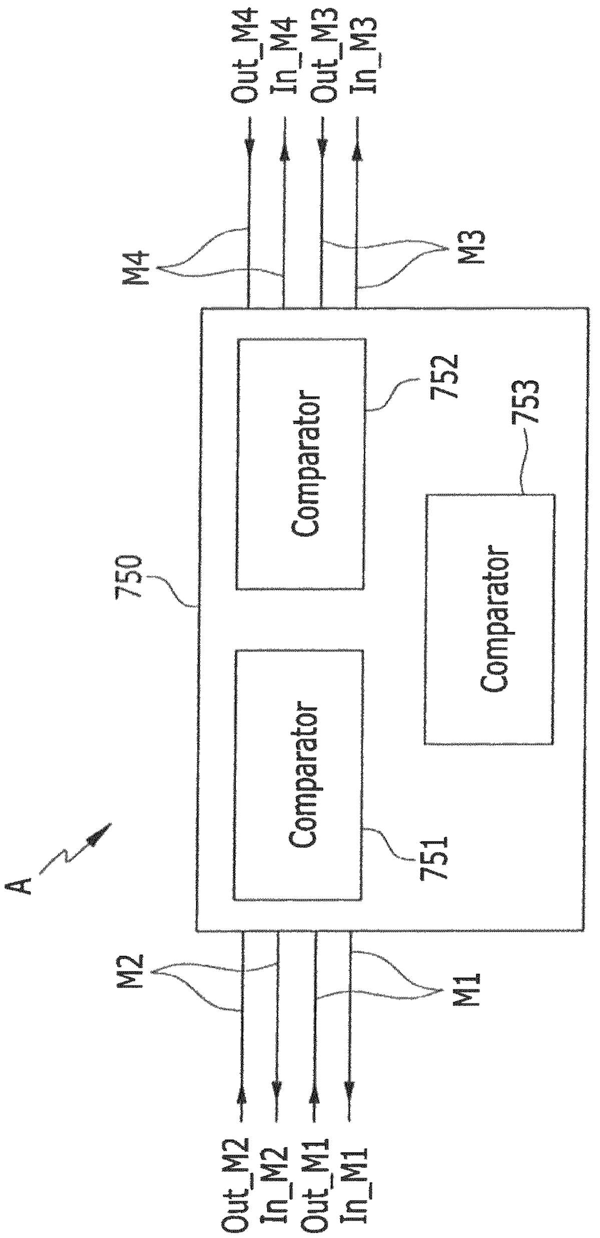
FIG. 2 is an enlarged view of a portion A of the display device of FIG. 1.

Referring to FIG. 1 and FIG. 2, a display device according to an exemplary embodiment of the inventive concept includes a display panel 1000 including a display area DA, and a peripheral area PA, and a circuit portion 750.

The display area DA includes a plurality of pixels that are arranged on a plane that includes an x direction and a y direction, and a plurality of signal lines. In the present disclosure, a structure observed in a direction that is perpendicular to the x direction and the y direction will be referred to as a planar structure, and a structure viewed in a direction that is perpendicular to the x direction and the y direction will be referred to as a cross-sectional structure.

The signal lines include a plurality of gate lines 121 that transmit a gate signal and a plurality of data lines 171 that transmit a data signal. The gate lines 121 may substantially extend in the x direction, and the data lines 171 may substantially extend in the y direction and thus cross the gate lines 121.

Each pixel PX may include at least one switch and a pixel electrode connected to the switch. In an embodiment, the switch is a three-terminal element such as a transistor integrated with the display panel 1000, and may be connected to at least one gate line 121 and at least one data line 171. The switch is turned on or turned off according to a gate signal transmitted by the gate line 121 to selectively transmit a data signal to the pixel electrode.

Each pixel PX may display one of specific colors to implement a color display, and an image or a desired color may be recognized by a combination of images of the specific colors. The specific colors displayed by the plurality of pixels PX may include, for example, three primary colors of red, green, and blue, three primary colors of yellow, cyan, and magenta, or may further include at least one different color such as white other than the three primary colors.

The display panel 1000 includes a substrate 110 where the pixels PX and the signal lines are formed. The substrate 110 may include glass or plastic. In an embodiment, the substrate 100 is made of a flexible material. For example, the substrate 110 may include various plastic such as polyethylene terephthalate (PET), polycarbonate (PC), polyarylate (PAR), polyether imide (PEI), polyethersulfone (PES), polyimide (PI), a metal thin film, or ultrathin glass.

The peripheral area PA is an area that is disposed at the outside of the display area DA, and may surround the periphery of the display are DA.

The peripheral area PA includes a plurality of sense wires M1, M2, M3, and M4. The plurality of sense wires M1, M2, M3, and M4 are provided to sense a defect such as a crack or lifting that occurs in the peripheral area PA of the display panel 1000 through wire resistance detection. FIG. 1 exemplarily shows that a pair of sense wires M1 and M2 are disposed in the left side and a pair of sense wires M3 and M4 are disposed in the right side with reference to the display area DA.

Each of the sense wires M1, M2, M3, and M4 may be a wire disposed at only one layer, or may be a wire formed by electrically connected portions that are disposed in different layers.

Opposite ends of each of the sense wires M1, M2, M3, and M4 are connected to the circuit portion 750. Opposite ends of each of the sense wires may be connected to the same side of the circuit portion 750. Each of the sense wires M1, M2, M3, and M4 may have a structure (or a meandering shape) in which one end of each extends along the left side or the right side of the display area DA and then is bent to return to the start point. A number of meandering paths of one meandering structure may be one or more. In addition, at least one of the plurality of sense wires M1, M2, M3, and M4 may have a plurality of meandering structures.

As shown in FIG. 1, each of the sense wires M1, M2, M3, and M4 may include a portion that extends along the left or right side of the display device DA and a portion that extends along a top edge of the display area DA. That is, each of the sense wires M1, M2, M3, and M4 may extend substantially in the y direction along the left or right edge of the display area DA (the wire may extend back and forth multiple times along the y direction in this area) and changes direction around a corner of the display panel 1000, and then extends substantially in the x direction along the top edge of the display area DA (the wire may extend back and forth multiple times in the x direction in this area) and changes direction at the center portion above the top edge of the display area DA to return to the start point. In an alternate embodiment, each of the sense wires M1, M2, M3, and M4 includes only a portion that extends along the left or right edge of the display area DA, and does not extend above the top edge of the display area DA.

A pair of sense wires M1 and M2 or M3 and M4 that are disposed in the peripheral area PA on one side with reference to the display area DA may include portions that extend in parallel with each other in the peripheral area PA. One sense wire (one of M2 and M4) may be disposed between the other sense wire (one of M1 and M3) and the display area DA. Opposite ends of the pair of sense wires M1 and M2 or M3 and M4 that are disposed in the peripheral area PA on one side with reference to the display area DA may be connected to the same side of the circuit portion 750. Here, the same side of the circuit portion 750 may imply one edge that extends in a constant direction as shown in the drawing, or may imply one edge that faces a constant direction when edges of the circuit portion 750 are divided into directions that the edges face.

The sense wires M1, M2, M3, and M4 may have different or similar resistances. For example, resistances of the sense wires that are disposed closer to the display area DA may be smaller than or equal to resistances of the sense wires M1 and M3 that are disposed closer to the edge of the display panel 1000.

The number of meandering structures and/or a number of meandering paths included in at least one of the plurality of sense wires M1, M2, M3, and M4 may be equal to or different from the number of meandering structures and/or a number of meandering paths included in the other sense wires M1, M2, M3, and M4. In an exemplary embodiment, the number of meandering structures and/or a number of meandering paths included in the sense wires M1 and M3 that are disposed further outside with reference to the display area DA is smaller than the number of meandering structures and/or a number of meandering paths included in the sense wires M2 and M4 that are disposed further inside. Accordingly, an area occupied by the sense wires M2 and M4 can be at least partially reduced so that the size of a bezel of the display panel 1000 can be reduced by reducing the peripheral areas PA in size, and wire length deviations due to positions of the sense wires M1, M2, M3, and M4 can be compensated.

The plurality of sense wires M1, M2, M3, and M4 may be disposed on the same layer in a cross-sectional view and may include the same material, and may be formed by simultaneously patterning them in the same manufacturing process. In such a case, the plurality of sense wires may be affected by the same or equivalent process distribution so that they may have similar wire width deviations.

When the sense wires M1, M2, M3, and M4 have a large resistance difference, a matching resistor may be further included to compensate for resistance deviations in the sense wires M1, M2, M3, and M4 having the large resistance difference.

A detection process of detecting a defect such as a crack may use a resistance of at least one of the plurality of sense wires M1, M2, M3, and M4 as a reference resistance. For example, the process may detect the defect by comparing the resistances of the other sense wires M1, M2, M3, and M4 with the reference resistance.

In an embodiment, a gate driver (e.g., gate driving circuit) is connected with the plurality of gate lines to apply a gate signal and located in the peripheral area PA.

The peripheral area PA may further include a bending area where the display panel 1000 is bent or bendable. In this case, when the bending state of the display panel 1000 is released and thus is unfolded to be flat, the bending area may be disposed between the display area DA and the circuit portion 750.

As shown in the drawing, the circuit portion 750 may be disposed in a printed circuit film 700 that is connected to the peripheral area PA of the display panel 1000. Alternatively, the circuit portion 750 may be directly mounted on the peripheral area PA of the display panel 1000 or may be directly formed on the substrate 110 together with constituent elements such as a transistor of the pixel PX. In an exemplary embodiment, at least one of a data driver (e.g., data driving circuit) that generates a data signal for driving the pixels PX and a timing controller (e.g., timing controller circuit) are disposed in the printed circuit film 700. The circuit portion 750 may be provided in the form of an integrated circuit (IC) chip.

The circuit portion 750 may include a plurality of pad portions that are electrically bonded with ends of the respective sense wires M1, M2, M3, and M4 or pad portions connected to the ends of the respective sense wires M1, M2, M3, and M4. The pad portions may be disposed at points where the sense wires M1, M2, M3, and M4 and the circuit portion 750 meet in FIG. 2.

When the circuit portion 750 is disposed in the printed circuit film 700, the sense wires M1, M2, M3, and M4 may extend to the printed circuit film 700. In this case, the sense wires M1, M2, M3, and M4 may include wires disposed in the display panel 1000 and wires that are disposed in the printed circuit film 700 and connected with the wires disposed in the display panel 1000.

Referring to FIG. 2, in the circuit portion 750, input signals In_M1, In_M2, In_M3, and In_M4, which are crack defect detection signals, are input to one end of the respective sense wires M1, M2, M3, and M4, respectively, and outputs signals Out_M1, Out_M2, Out_M3, and Out_M4 may be output from the other end of the respective sense wires M1, M2, M3, and M4, respectively.

The circuit portion 750 includes at least one comparator (e.g., a comparator circuit, an Op-amp comparator, etc.). While FIG. 2 illustrates the circuit portion 750 includes three comparators 751, 752, and 753, embodiments of the inventive are not limited thereto. For example, the circuit portion 750 may include one or two comparators. The first comparator 751 may compare the output signal Out_M1 from the sense wire M1 and the output signal Out_M2 from the sense wire M2 and output a comparison result. The second comparator 752 may compare the output signal Out_M3 from the sense wire M3 and the output signal Out_M4 from the sense wire M4 and output a comparison result. The third comparator 753 may output a determination result by comparing the output signal Out_M1 or Out_M2 from the sense wire M1 or M2 disposed in the peripheral area PA on one side (e.g., the left side) with reference to the display area DA and one side (e.g., the left side) of the peripheral area PA and the output signal Out_M3 or Out_M4 from the sense wire M3 or M4 that is disposed in the other side (e.g., the right side). For example, the third comparator 753 may compare the output signal Out_M1 with the output signal Out_M3, compare the output signal Out_M1 with the output signal Out_M4, compare the output signal Out_M2 with the output signal Out_M3, or compare the output signal Out_M2 with the output signal Out_M4.

In an embodiment, the circuit portion 750 includes at least one analog-to-digital converter (ADC) that converts the output signals Out_M1, Out_M2, Out_M3, and Out_M4 into digital values. The at least one ADC may be provided between the pad portions of the circuit portion 750, connected with the sense wires M1, M2, M3, and M4 and the comparators 751, 752, and 753. The ADC may be included in each of the comparators 751, 752, and 753.

According to an exemplary embodiment, only one sense wire is disposed in the peripheral area PA that is disposed on one side with reference to the display area DA. That is, one of the sense wires M1 and M2 shown in FIG. 1 and FIG. 2 may be omitted, or one of the sense wires M1 and M2 and one of the sense wires M3 and M4 may be omitted. In this case, at least one of the two comparators 751 and 752 may be omitted.

According to an exemplary embodiment, the sense wires may be disposed only on one side with reference to the display area DA in the exemplary embodiment of FIG. 1. That is, in FIG. 1, both the sense wires M1 and M2 may be omitted or both the sense wires M3 and M4 may be omitted. In this case, one of the two comparators 751 and 752 may be omitted.

A cross-sectional structure of the display device according to an exemplary embodiment of the present invention will now be described with reference to FIG. 3, together with FIG. 1 and FIG. 2.

Figure 3:
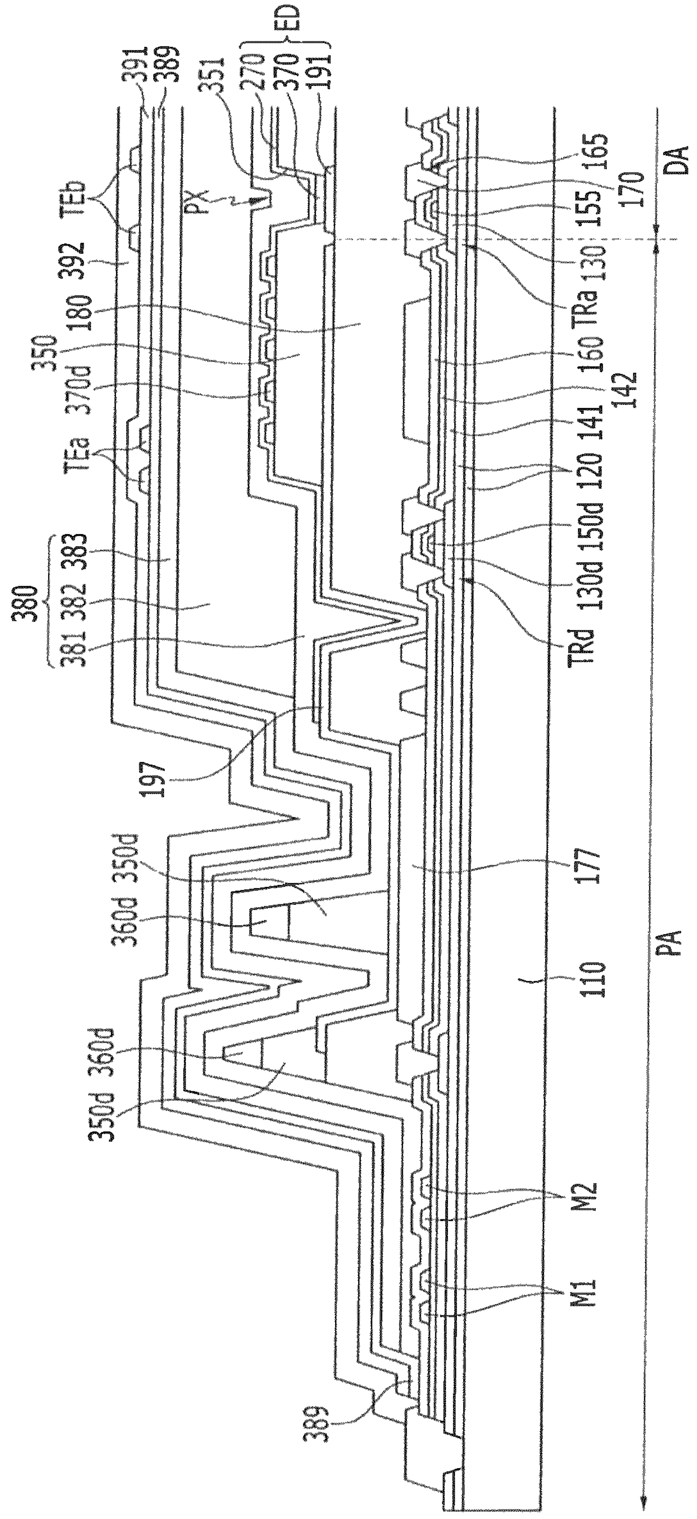
FIG. 3 is a cross-sectional view of the display device of FIG. 1, taken along line III-IIIa.

Referring to FIG. 3, a barrier layer 120 is disposed on the substrate 110. As shown in the drawing, the barrier layer 120 may include a plurality of layers, or it may be provided as a single layer.

An active pattern is disposed on the barrier layer 120. The active pattern includes an active pattern 130 disposed in the display area DA and an active pattern 130*d* disposed in the peripheral area PA. The active patterns 130 and 130*d* may respectively include source regions, drain regions, and channel regions. The active pattern may include amorphous silicon, polysilicon, or an oxide semiconductor.

A first insulation layer 141 is disposed on the active patterns 130 and 130*d*, and a first conductive layer may be disposed on the first insulation layer 141. The first conductive layer may include a conductor 155 that overlaps the active pattern 130 that is disposed in the display area DA, a conductor 150*d* that overlaps the active pattern 130*d* that is disposed in the peripheral area PA, and the above-described plurality of gate lines 121.

The active pattern 130 and the conductor 155 overlapping the active pattern 130 form a transistor TRa, and the active pattern 130*d* and the conductor 150*d* overlapping the active pattern 130*d* form a transistor TRd. The transistor TRa may serve as a switch included in each pixel PX disposed in the display area DA, and the transistor TRd may serve as a switch included in a gate driver.

A second insulation layer 142 is disposed on the first conductive layer and the first insulation layer 141, and a second conductive layer is disposed on the second insulation layer 142. The second conductive layer may include at least one of the sense wires M1, M2, M3, and M4, but the inventive concept is not limited thereto. At least one of the sense wires M1, M2, M3, and M4 may be disposed in a conductive layer other than the second conductive layer.

A third insulation layer 160 is disposed on the second conductive layer and the second insulation layer 142.

At least one of the first insulation layer 141, the second insulation layer 142, and the third insulation layer 160 may include an inorganic insulation material such as a silicon nitride (SiNx), a silicon oxide (SiOx), and/or an organic insulation material.

The first insulation layer 141, the second insulation layer 142, and the third insulation layer 160 may include a contact hole 165 that is formed on a source regions and/or drain regions of the transistors TRa and TRd.

A third conductive layer is disposed on the third insulation layer 160. The third conductive layer may include a conductor 170 that is connected with the source regions or the drain regions of the transistors TRa and TRd through a contact hole 165, a voltage transmission line 177, and the above-described data lines 171. The voltage transmission line 177 is disposed in the peripheral area PA. In an embodiment, the voltage transmission line transmits a constant voltage such as a common voltage ELVSS.

At least one of the first conductive layer, the second conductive layer, and the third conductive layer may include a conductive material such as copper (Cu), aluminum (Al), molybdenum (Mo), titanium (Ti), tantalum (Ta), and an alloy of at least two of them.

A passivation layer 180 is disposed on the third conductive layer and the third insulation layer 160. The passivation layer 180 may include an inorganic insulation material and/or an organic insulation material such as a polyacrylic resin, or a polyimide resin. In an embodiment, the passivation layer 180 has a substantially flat or entirely flat top surface. The passivation layer 180 may include a contact hole (not shown) that is disposed on the voltage transmission layer 177 that is formed in the peripheral area PA.

A pixel electrode layer is disposed on the passivation layer 180. The pixel electrode layer may include a pixel electrode 191 that corresponds to each pixel PX of the display area DA and a voltage transmission electrode 197 that is disposed in the peripheral area PA. In an embodiment, the voltage transmission electrode 197 is physically and electrically connected with the voltage transmission line 177 through the contact hole of the passivation layer 180, and receives the common voltage ELVSS.

The pixel electrode layer may include a semi-permeable conducting material or a reflective conducting material.

A pixel definition layer 350 is disposed on the passivation layer 180 and the pixel electrode layer. The pixel definition layer 350 includes an opening 351 that is disposed on the pixel electrode 191, and may further include at least one dam portion **350*d* that is disposed in the peripheral area PA. The dam portion 350*d* may extend in parallel with an edge of the substrate 110. A spacer 360*d* may further be disposed on the dam portion 350*d***.

While FIG. 3 illustrates that at least one of the sense wires M1, M2, M3, and M4 is disposed in the outer side with reference to the dam portion **350*d*, but the inventive concept is not limited thereto. That is, at least one of the sense wires M1, M2, M3, and M4 may be disposed in the inner side with reference to the dam portion 350*d***.

The voltage transmission electrode 197 includes a portion that is not covered by the pixel definition layer 350.

The pixel definition layer 350 may include a photosensitive material such as a polyacrylic resin or a polyimide resin.

An emission layer 370 is disposed on the pixel electrode 191. The emission layer 370 may include a portion that is disposed in the opening 351 of the pixel definition layer 350. The emission layer 370 may further include at least one dummy emission layer **370*d* that is disposed in the peripheral area PA and placed on the pixel definition layer 350. The emission layer 370** may include an organic light emitting material or an inorganic light emitting material.

A common electrode 270 is disposed on the emission layer 370. The common electrode 270 may also be disposed on the pixel definition layer 350 and thus may be continuously formed over the plurality of pixels PX. The common electrode 270 is physically and electrically connected with the voltage transmission electrode 197 in the peripheral area PA and thus receives the common voltage ELVSS. In an embodiment, the common electrode 270 includes a conductive transparent material.

A pixel electrode 191, an emission layer 370, and a common electrode 270 of each pixel PX form an emission diode ED. One of the pixel electrode 191 and the common electrode 270 is a cathode of the emission diode ED and the other is an anode of the emission diode ED.

An encapsulation portion 380 that protects the emission diode ED by encapsulating the emission diode ED may be disposed on the common electrode 270. The encapsulation portion 380 includes at least one of inorganic layers 381 and 383 and at least one organic layer 382, and the at least one of the inorganic layers 381 and 383 and the at least one organic layer 382 may be alternately stacked. The organic layer 382 includes an organic material and may have a planarization characteristic. The inorganic layers 381 and 383 may include an inorganic material such as an aluminum oxide (AlOx), a silicon oxide (SiOx), or a silicon nitride (SiNx).

Since the planar area of the organic layer 382 is wider than the planar area of the inorganic layers 381 and 383, the two inorganic layers 381 and 383 may contact each other in the peripheral area PA. The lowermost inorganic layer 381 among the two inorganic layers 381 and 383 may contact the top surface of the third insulation layer 160, but the inventive concept is not limited thereto.

An edge of the organic layer 382 included in the encapsulation portion 380 may be disposed between the dam portion **350*d* and the display area DA. The dam portion 350*d* may serve to prevent the organic material from flowing to the outside when forming the organic layer 382 of the encapsulation portion 380**.

A buffer layer 389 that includes an inorganic insulating material or/and an organic insulating material may be disposed on the encapsulation portion 380. In an embodiment, the buffer layer 389 is omitted.

A fourth conductive layer may be disposed on the buffer layer 389. The fourth conductive layer may include a first touch conductor TEa. A first touch insulation layer 391 is disposed on the fourth conductive layer, and a fifth conductive layer may be disposed on the first touch insulation layer 391. The fifth conductive layer may include a second touch conductor TEb. A second touch insulation layer 392 may be disposed on the fifth conductive layer. The first touch conductor Tea and the second touch conductor TEb may form a capacitive touch sensor, and thus when an external object touches it, touch information such as whether it is touched or a touch location may be sensed by using the capacitive touch sensor.

Next, an example of a detailed structure of a pixel PX included in a display device according to an exemplary embodiment of the present invention will be described with reference to FIG. 4 and FIG. 5, together with the above-described FIG. 1 to FIG. 3.

A display device according to a present exemplary embodiment includes a plurality of scan lines 151, 152, and 154 and a control line 153 that transmits a light emission control signal. The plurality of scan lines 151, 152, and 154 and the control line 153 may be included in the above-described gate lines 121, and may be included in the above-described first conductive layer in the cross-sectional view.

The display device according to the present exemplary embodiment may further include a storage line 156 and an initialization voltage line 159, and the storage line 156 and the initialization voltage line 159 may be included in the above-described second conductive layer in the cross-sectional view. The storage line 156 may include an expansion portion 157 that is disposed in each pixel PX. The initialization voltage line 159 may transmit an initialization voltage.

The display device according to the present exemplary embodiment may further include the data lines 171 and a driving voltage line 172, and the data lines 171 and the driving voltage line 172 may be included in the above-described third conductive layer in the cross-sectional view. The data lines 171 and the driving voltage line 172 may cross the plurality of scan lines 151, 152, and 154. The expansion portion 157 of the storage line 156 is connected with the driving voltage line 172 through a contact hole 68 and receives a driving voltage ELVDD.

Each pixel PX may include a plurality of transistors T1, T2, T3_1, T3_2, T4_1, T4_2, T5, T6, and T7 that are connected with the scan lines 151, 152, and 154, the control line 153, the data lines 171, and the driving voltage line 172, a capacitor Cst, and an emission diode ED. The plurality of transistors T1, T2, T3_1, T3_2, T4_1, T4_2, T5, T6, and T7 may be included in the above-described transistor TRa. A channel of each of the plurality of transistors T1, T2, T3_1, T3_2, T4_1, T4_2, T5, T6, and T7 may be formed in the above-described active pattern 130. The active pattern 130 includes channel regions 131*a*, 131*b*, 131*c*_1, 131*c*_2, 131*d*_1, 131*d*_2, 131*c*, 131*f*, and 131*g* where the respective channels of the transistors T1, T2, T3_1, T3_2, T4_1, T4_2, T5, T6, and T7 are formed, and a conductive region. The conductive region of the active pattern 130 is disposed at opposite sides of each of the channel regions 131*a*, 131*b*, 131*c*_1, 131*c*_2, 131*d*_1, 131*d*_2, 131*c*, 131*f*, and 131*g*, and has a higher carrier concentration than that of the channel regions 131*a*, 131*b*, 131*c*_1, 131*c*_2, 131*d*_1, 131*d*_2, 131*e*, 131*f*, and 131*g*. A pair of conductive regions that are disposed at opposite sides of each of the channel regions 131*a*, 131*b*, 131*c*_1, 131*c*_2, 131*d*_1, 131*d*_2, 131*e*, 131*f*, and 131*g* of the respective transistors T1, T2, T3_1, T3_2, T4_1, T4_2, T5, T6, and T7 may be a source region and a drain region of the corresponding transistors T1, T2, T3_1, T3_2, T4_1, T4_2, T5, T6, and T7, and thus serve as a source electrode and a drain electrode, respectively.

The first transistor T1 includes the channel region 131*a*, a source region 136*a*, a drain region 137*a*, and a driving gate electrode 155*a* that overlaps the channel region 131*a* on a plane. The driving gate electrode 155*a* may be included in the above-described first conductive layer, and may be connected with a connection member 174 through a contact hole 61. The connection member 174 may be included in the above-described third conductive layer in the cross-sectional view. The contact hole 61 may be disposed in a contact hole 51 included in the expansion portion 157.

The second transistor T2 includes the channel region 131*b*, a source region 136*b*, a drain region 137*b*, and a gate electrode 155*d* that is a part of the scan line 151 that overlaps the channel region 131*b* on a plane. The source region 136*b* is connected with the data line 171 through a contact hole 62, and the drain region 137*b* is connected with the source region 136*a* of the first transistor T1.

The third transistors T3_1 and T3_2 include a top third transistor T3_1 and a bottom third transistor T3_2 that are connected with each other. The top third transistor T3_1 includes the channel region 131*c*_1, a source region 136*c*_1, a drain region 137*c*_1, and a gate electrode 155*c*_1 that is a part of the scan line 151 overlapping the channel region 131*c*_1. The drain region 137*c*_1 is connected with the connection member 174 through a contact hole 63. The bottom third transistor T3_2 includes the channel region 131*c*_2, a source region 136*c*_2, a drain region 137*c*_2, and a gate electrode 155*c*_2 that is a part of the scan line 151 overlapping the channel region 131*c*_2.

The fourth transistors T4_1 and T4_2 includes a left fourth transistor T4_1 and a right fourth transistor T4_2 that are connected to each other. The left fourth transistor T4_1 includes the channel region 131*d*_1, a source region 136*d*_1, a drain region 137*d*_1, and a gate electrode 155*d*_1 which is a part of the scan line 152 overlapping the channel region 131*d*_1. The drain region 137*d*_1 is connected with the drain region 137*c*_1 of the top third transistor T3_1 and is connected with the connection member 174 through the contact hole 63. The right fourth transistor T4_2 includes the channel region 131*d*_2, a source region 136*d*_2, a drain region 137*d*_2, and a gate electrode 155*d*_2 that is a part of the scan line 152 overlapping the channel region 131*d*_2. The drain region 137*d*_2 is connected with the source region 136*d*_1 of the left fourth transistor T4_1, and the source region 136*d*_2 is connected with a connection member 175 through a contact hole 65.

The connection member 175 may be included in the second conductive layer or the third conductive layer in the cross-sectional view. When the connection member 175 is included in the third conductive layer, the connection member 175 may be electrically connected with the initialization voltage line 159 through a contact hole 64.

The fifth transistor T5 includes the channel region 131*e*, a source region 136*e*, a drain region 137*e*, and a gate electrode 155*e* which is a part of the control line 153 overlapping the channel region 131*e*. The source region 136*e* is connected with the driving voltage line 172 through a contact hole 67, and the drain region 137*e* is connected with the source region 136*a* of the first transistor T1.

The sixth transistor T6 includes the channel region 131*f*, a source region 136*f*, a drain region 137*f*, and a gate electrode 155*f* which is a part of the control line 153 overlapping the channel region 131*f*. The source region 136*f* is connected with the drain region 137*a* of the first transistor T1, and the drain region 137*f* is connected with a connection member 179 through a contact hole 69. The connection member 179 may be included in the above-described third conductive layer in the cross-sectional view.

The seventh transistor T7 includes the channel region 131*g*, a source region 136*g*, a drain region 137*g*, and a gate electrode 155*g* which is a part of the scan line 154 overlapping the channel region 131*g*. The source region 136*g* is connected with the drain region 137*f* of the sixth transistor T6, and the drain region 137*g* may be connected with the connection member 175 through the contact hole 65 and thus receive an initialization voltage.

The capacitor Cst may include the driving gate electrode 155*a* and the expansion portion 157 of the storage line 156 that overlap each other, interposing the second insulation layer 142 therebetween, as two terminals.

The above-described pixel electrode layer may include the pixel electrode 191 and a pixel conductive pattern 192. The pixel electrode 191 is connected with the connection member 179 through a contact hole 89 and thus may receive a data voltage. The pixel conductive pattern 192 may be bent along an edge of the pixel electrode 191. The pixel conductive pattern 192 may transmit an initialization voltage.

Next, a method for detecting a defect such as a crack in a display device according to an exemplary embodiment of the invention will be described with reference to FIG. 6, together with the above-described drawings.

First, a circuit portion 750 inputs input signals In_M1, In_M2, In_M3, and In_M4 respectively to a plurality of sense wires M1, M2, M3, and M4, and receives output signals Out_M1, Out_M2, Out_M3, and Out_M4 in response to the input signals. The circuit portion 750 detects wire resistance of the respective sense wires M1, M2, M3, and M4 based on the output signals Out_M1, Out_M2, Out_M3, and Out_M4 to determine whether the detected resistance is included in a first predetermined range (S61). The first predetermined range may be set to a range of above 15% (+15%) and below 15% (−15%) with respect to a center value (e.g., about 500 kΩ, 600 kΩ, 700 kΩ, and the like), but embodiments of the invention are not limited thereto. When the wire resistance of at each of the sense wires M1, M2, M3, and M4 is determined to be included within the first predetermined range, each wire is determined to be in a normal wire state within a distribution range of process and thus the wire is determined to be good. When the wire resistance of one of the sense wires M1, M2, M3, and M4 is determined to be outside the first predetermined range, the corresponding sense wire is determined to have a defect.

Next, when the wire resistances of all the sense wires M1, M2, M3, and M4 are determined to be included in the first predetermined range, comparators 751, 752, and 753 of the circuit portion 750 compare the detected wire resistances of the sense wires M1, M2, M3, and M4 and determine whether a result (i.e., a difference or a ratio between resistances) is included within a second predetermined range (S62). When the wire resistance of one of the sense wires M1, M2, M3, and M4 is set as a reference resistance, the second predetermined range may be set as a range of a ratio (e.g., within 15%) of a resistance comparison value with respect to the reference resistance. When the resistance comparison value is included in the second predetermined range, the corresponding sense wire is determined to be good, otherwise it is determined as having a defect. A degree of detection may be controlled by adjusting the second predetermined range. In an exemplary embodiment, if the resistance of one of the sense wires is much different from the other sense wires, the one sense wire is determined to have a defect. For example, if the resistances of the second and third sensing wires differ from the first sensing wire by less than 100 kΩ and the resistance of the fourth sensing wire differs from the first sensing wire by more than 100 kΩ, it could be concluded that the fourth sensing wire has a defect.

The second predetermined range may have a plurality of different ranges to determine a degree of crack progression. For example, the second predetermined range may have a plurality of ranges that are divided into a plurality of levels such as 3, 5, 7, 9, 12, 15, 20, 25, 30, and 40(%). It is possible to determine in which range of the plurality of ranges the resistance comparison value (difference or ratio) is in to obtain detailed information on the progress of the crack. Particularly, a degree of a minute crack may be detected by determining in which range of a relatively small range (e.g., below 15%) the resistance comparison value is included. A currently calculated degree of crack progression for a given sense wire can be stored and compared against a newly calculated degree of crack progression to the given sense wire to predict when the crack will advance from a minor crack to a major crack.

When the sense wires M1, M2, M3, and M4 are simultaneously formed through the same manufacturing process, they may have an equivalent wire width variation due to being affected by the same process distribution, and accordingly the sense wires M1, M2, M3, and M4 may be reference wires for each other for comparing variations in the wire resistance.

In an exemplary embodiment, occurrence of a crack in the left peripheral area PA of the display area DA is detected by using a resistance comparison value between the sense wire M1 and the sense wire M2 that are disposed in the left side with reference to the display area DA. In an exemplary embodiment, occurrence of a crack in the right peripheral area PA of the display area DA is detected by using a resistance comparison value between the sense wire M3 and the sense wire M4 that are disposed in the right side with reference to the display area DA. Since the crack often starts from the outside of the substrate 110, the sense wires M2 and M4 that are disposed closer to the display area DA have a low probability of having a higher resistance than the sense wires M1 and M3 that are disposed closer to the edge of the display panel 1000. Thus, even though a crack occurs in the peripheral area PA, the appearance or extent of the crack may be different in the two wires. Accordingly, when a defect such as a crack occurs in the display panel 1000, an occurrence of a crack may be detected by using a difference between wire resistances of the sense wires (M1 and M2 or M3 and M4) that are disposed in the same side with reference to the display area DA.

However, when a crack occurs in a large area of the peripheral area PA that is disposed in one side with reference to the display area DA, it may be difficult to detect a wire resistance difference between two sense wires M1 and M2 or M3 and M4 that are disposed on the same side of the peripheral area PA and adjacent each other. In this case, in the present exemplary embodiment, resistance of one sense wire (i.e., one of M1 and M2) and resistance of one sense wire (i.e., one of M3 and M4) that are disposed on the different sides of the peripheral area PA with reference to the display area DA are compared to accurately determine an occurrence of a defect such as a crack in the peripheral area PA.

According to at least one embodiment of the present invention, an occurrence of a crack in the display panel 1000 can be determined through the circuit portion 750 in a digital manner so that a defect such as a crack can be easily detected. Further, when the plurality of sense wires M1, M2, M3, and M4 experience the same process distribution are used as references with respect to each other, erroneous detection due to process distribution can be prevented, thereby increasing defect detection accuracy.

Also, detailed information on the progress of the crack can be acquired by determining which range of the plurality of ranges a resistance comparison value is in within the second predetermined range.

In addition, it is possible to easily adjust sensitivity of detection of an occurrence of a defect, such as a crack. Further, the first predetermined range and the second predetermined range can be freely adjusted.

Figure 6:
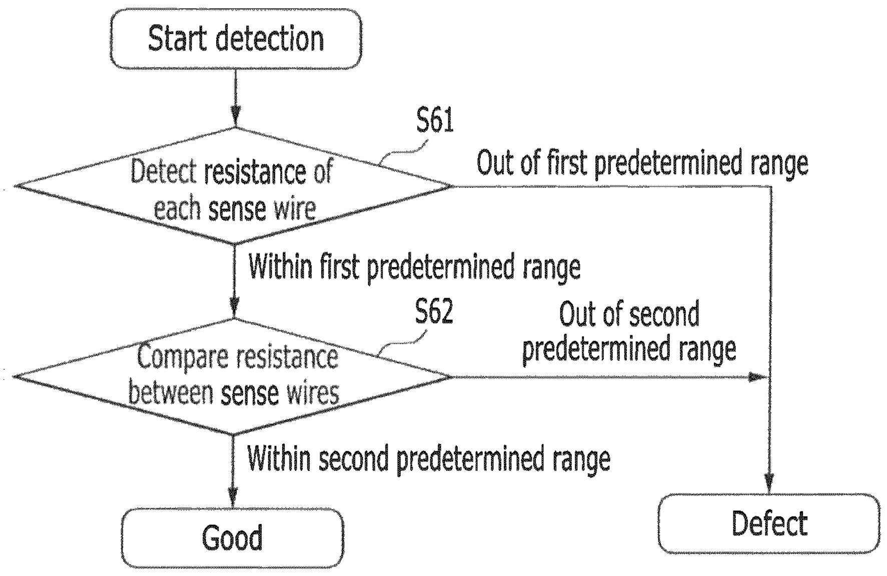
FIG. 6 is a flowchart of a method for inspecting a defect such as a crack in a display device according to an exemplary embodiment of the inventive concept.

In an exemplary embodiment, the step (S61) of FIG. 6 for determining whether resistances of the sense wires M1, M2, M3, M4 are included in the first predetermined range is omitted, and only the step (S62) of FIG. 6 for comparing detected resistances is performed.

According to an exemplary embodiment of the invention, the circuit portion 750 further includes a comparator that compares a resistance comparison result of two sense wires that are disposed on the same side with reference to the display area DA and a resistance comparison result of two sense wires that are disposed in opposite sides with reference to the display area DA. In this case, the circuit portion 750 may determine which side of the display area DA has generated a crack or which side of the display area DA has generated more cracks. For example, when a resistance difference between two sense wires M1 and M2 or M3 and M4 that are disposed on the same side (e.g., a first side) with reference to the display area DA is greater than a resistance difference between two sense wires (i.e., one of M1 and M2 and one of M3 and M4) that are disposed in the opposite sides with reference to the display area DA, it may be determined that a crack or more cracks are generated in the peripheral area PA of the first side, and in the opposite case, it may be determined that a crack or more cracks are generated in the peripheral area PA of the side opposite the first side.

When only one sense wire is disposed in the peripheral are PA in one side with reference to the display area DA according to an exemplary embodiment, resistances of two sense wires that are disposed in the opposite sides with reference to the display area DA are compared by the comparator 753 to determine an occurrence of a defect such as a crack.

According to an exemplary embodiment, two sense wires M1 and M2 or M3 and M4 that are disposed in the peripheral area PA on the same side with reference to the display area DA extend in different directions. In this case, there is a high probability that cracks will not simultaneously occur in both of the two sense wires. Thus, it can be accurately determined whether a defect such as a crack is generated in the display panel 1000 through resistance comparison of two sense wires M1 and M2 or M3 and M4.

Wire resistance comparison between sense wires M1, M2, M3, and M4 for defect detection such as a crack in the display panel 1000 can be performed by various other methods.

Next, a display device according to an exemplary embodiment of the invention will be described with reference to FIG. 7, together with the above-described drawings. Hereinafter, the same reference numerals will designate the same constituent elements as those of the above-described embodiment, and thus the same description is omitted.

Figure 7:
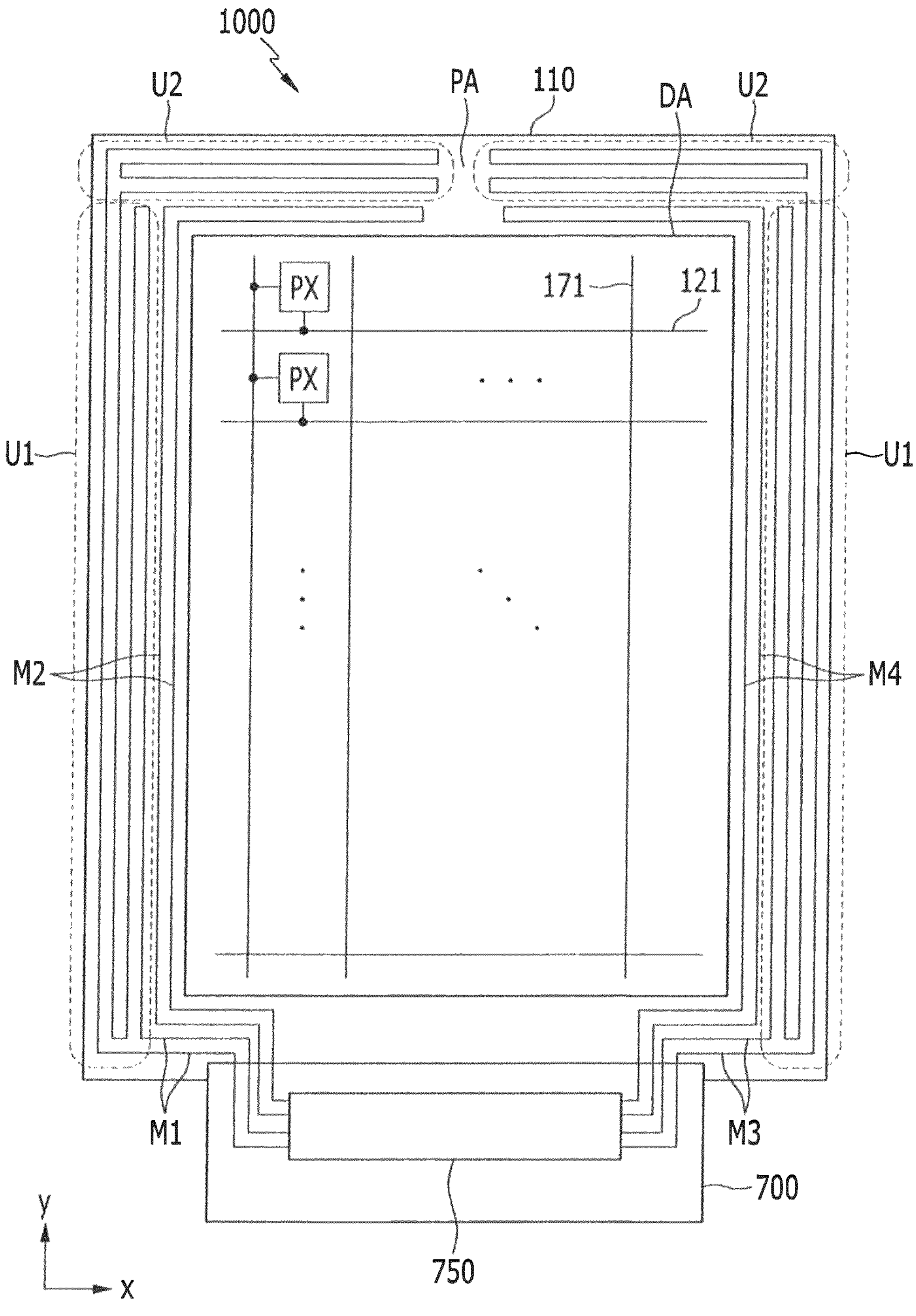
FIG. 7 and FIG. 8 are layout views of display devices according to exemplary embodiments of the inventive concept.

Referring to FIG. 7, a display device according to a present exemplary embodiment is similar to the display device of the above-described exemplary embodiment, except that at least one of the sense wires M1, M2, M3, and M4 has a plurality of meandering structures U1 and U2. In particular, FIG. 7 illustrates an example in which sense wires M1 and M3, which are some of the plurality of sense wires M1, M2, M3, and M4, have the plurality of meandering structures U1 and U2. At least one of the plurality of sense wires M1, M2, M3, and M4, having the plurality of meandering structures U1 and U2, may form the meandering structure U1 by extending back and forth multiple times in the y direction in a left or right peripheral area PA with reference to a display area D, form the meandering structure U2 by extending back and forth multiple times in the x direction in a top periphery area PA of the display area DA, and then return to a start point to be connected with a circuit portion 750.

In an embodiment, the first sense wire M1 includes a first section extending to the left in the x direction and a first forked portion connected to the first section, where the first forked portion includes second and third sections spaced apart from one another and extending upwards in the y direction. The first sense wire M1 may further include a second forked portion connected to the third section, where the second forked portion includes fourth and fifth sections spaced apart from one another and extending to the right in the x direction. In the embodiment, the third sense wire M3 includes a first section extending to the right in the x direction and a first forked portion connected to the first section, where the first forked portion includes second and third sections spaced apart from one another and extending upwards in the y direction. The third sense wire M3 may further include a second forked portion connected to the third section, where the second forked portion includes fourth and fifth sections spaced apart from one another and extending to the left in the x direction. In this embodiment, the sections of the second forked portion of the first sense wire M1 and the sections of the second forked portion of the third sense wire M3 extends towards one another, but do not contact one another (i.e., they are spaced apart from one another).

While FIG. 7 shows that the sense wires M2 and M4 do not include meandering structures (e.g., forked portions), in an exemplary embodiment, the sense wires M2 and M4 include a plurality of meandering structures like the sense wires M1 and M3.

According to an exemplary embodiment of FIG. 7, the entire wire length of the sense wires M2 and M4 is shorter than the entire wire length of the sense wires M1 and M3 that have the plurality of meandering structures U1 and U2, and accordingly, the area of a portion occupied by the sense wires M2 and M4 is smaller than the area of a portion occupied by the sense wires M1 and M3. In order to reduce a bezel area of the display device, areas occupied by the sense wires M1, M2, M3, and M4 may be reduced. For example, to reduce one or more of these areas, a number of meandering paths of the meandering structure of a part of the sense wires M2 and M4 may be minimized or the wire length may be minimized.

When one or more of the areas is reduced, the circuit portion 750 may additionally perform a step for compensating a wire resistance difference of the sense wires M2 and M4 with respect to the sense wires M1 and M3 in the method for detecting a defect such as a crack. For example, in order to compensate for a resistance difference between the sense wires M2 and M4 with respect to the sense wires M1 and M3, a weight value is applied (e.g., multiplied) to detected resistances of the sense wires M2 and M4 to compensate for a resistance difference due to a wire length difference between the sense wires M1 and M3 and the sense wires M2 and M4. Specifically, the circuit portion 750 determines in which levels of 20%, 40%, 60%, 80%, and 100% of the wire resistances of the sense wires M1 and M3 the wire resistance weight value of the sense wires M2 and M4 is included, and then a corresponding weight value is applied to thereby compensate for a wire resistance deviation.

Even though no crack is generated, the sense wires M1, M2, M3, and M4 may have resistance differences due to various other factors such as a length difference depending on positions, and in this case, the circuit portion 750 may apply a weight value to the detected resistance as in the manner described above so as to compensate for the resistance difference.

Next, a display device according to an exemplary embodiment of the invention will be described with reference to FIG. 8 and FIG. 9, together with the above-described drawings.

Figure 8:
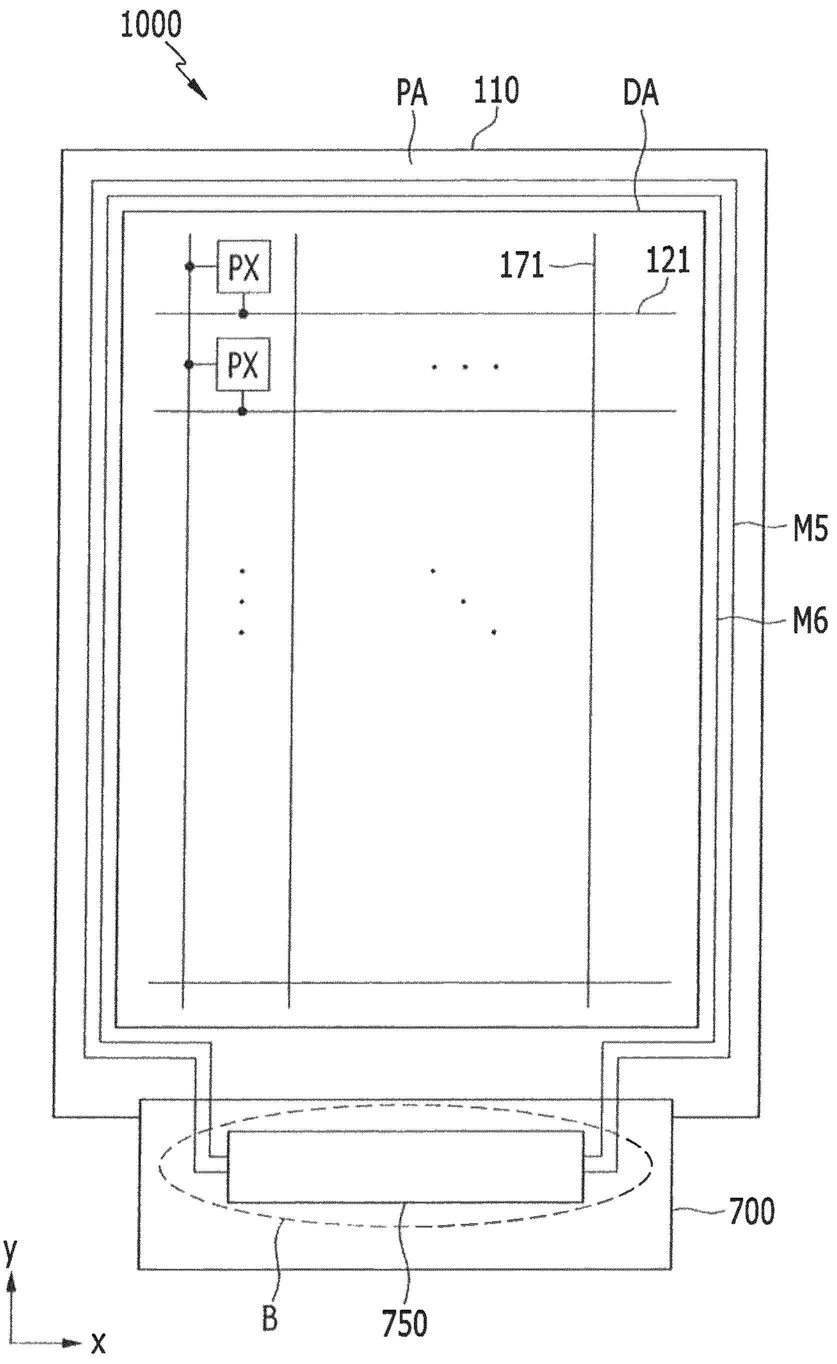
Figure 9:
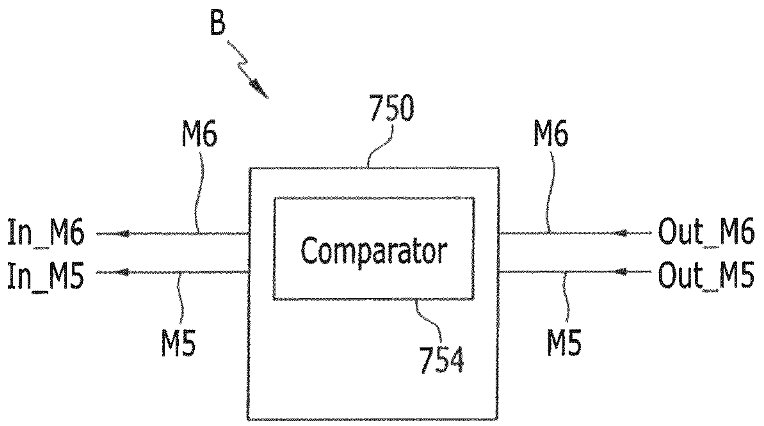
FIG. 9 is an enlarged view of a portion B in the display device of FIG. 8.

Referring to FIG. 8 and FIG. 9, a display device according to the present exemplary embodiment is similar to the display device of the above-described exemplary embodiment, except that only a pair of sense wires M5 and M6 are provided in the entire peripheral area PA such that an area occupied by sense wires in the peripheral area PA can be reduced and the number of pad portions of a circuit portion 750 can be reduced.

One end of the sense wire M5 is connected to one side of the circuit portion 750, and the other end is connected to the other side (e.g., the opposite side) of the circuit portion 750. In an embodiment, the sense wire M5 extend along at least three edges including a left side, a top side, and a right side of a display area DA from one end to the other. The sense wire M5 extending along the periphery of the display area DA may partially have at least one meandering structure (or a meandering shape) that extends back and forth multiple times. A plurality of meandering structures may be formed of one continuous wire.

One end of the sense wire M6 is connected to one end of the circuit portion 750, and the other end is connected to the other end of the circuit portion 750. A structure of the sense wire M6 may be similar to that of the sense wire M5.

The two sense wires M5 and M6 may have similar or different wire resistances. For example, wire resistance of the sense wire M6 may be lower than that of the sense wire M5, and in this case, the number of meandering structures and/or the number of meandering paths included in the sense wire M6 may be smaller than the number of meandering structures and/or the number of meandering paths included in the sense wire M5.

While FIG. 8 shows the sense wire M6 being disposed between the sense wire M5 and the display area DA, embodiments of the invention are not limited thereto. For example, the position of the sense wire M5 and the position of the sense wire M6 shown in FIG. 8 may be switched with each other.

Referring to FIG. 9, the circuit portion 750 includes a comparator 754. The circuit portion 750 may input signals In_M5 and In_M6, which are crack defect inspection signals, to one end of the respective sense wires M5 and M6, and may receive output signals Out_M5 and Out_M6 from the other end of the respective sense wires M5 and M6 in response to the input signals. In an embodiment, the comparator 754 compares the output signal Out_M5 from the sense wire M5 and the output signal Out_M6 from the sense signal M6 to generate a comparison result. A first resistance of the sense wire M5 may be determined from the output signal Out_M5 and a second resistance of the sense wire M6 may be determined from the output signal Out_M6. If one or more of the first and second resistances are outside a particular first resistance range, it can be determined that a crack is present. If both of the resistances are within the first resistance range, but the resistances are very different from another, it can be determined that a crack is present. It can be determined that the resistances are very different from one another when the difference between the two resistances is greater than a certain threshold. Other operations of the circuit portions 750 are the same as in the above-described inspection method, and therefore the same description will be omitted.

Next, a display device according to an exemplary embodiment will be described with reference to FIG. 10 to FIG. 12, together with the above-described drawings.

Figure 10:
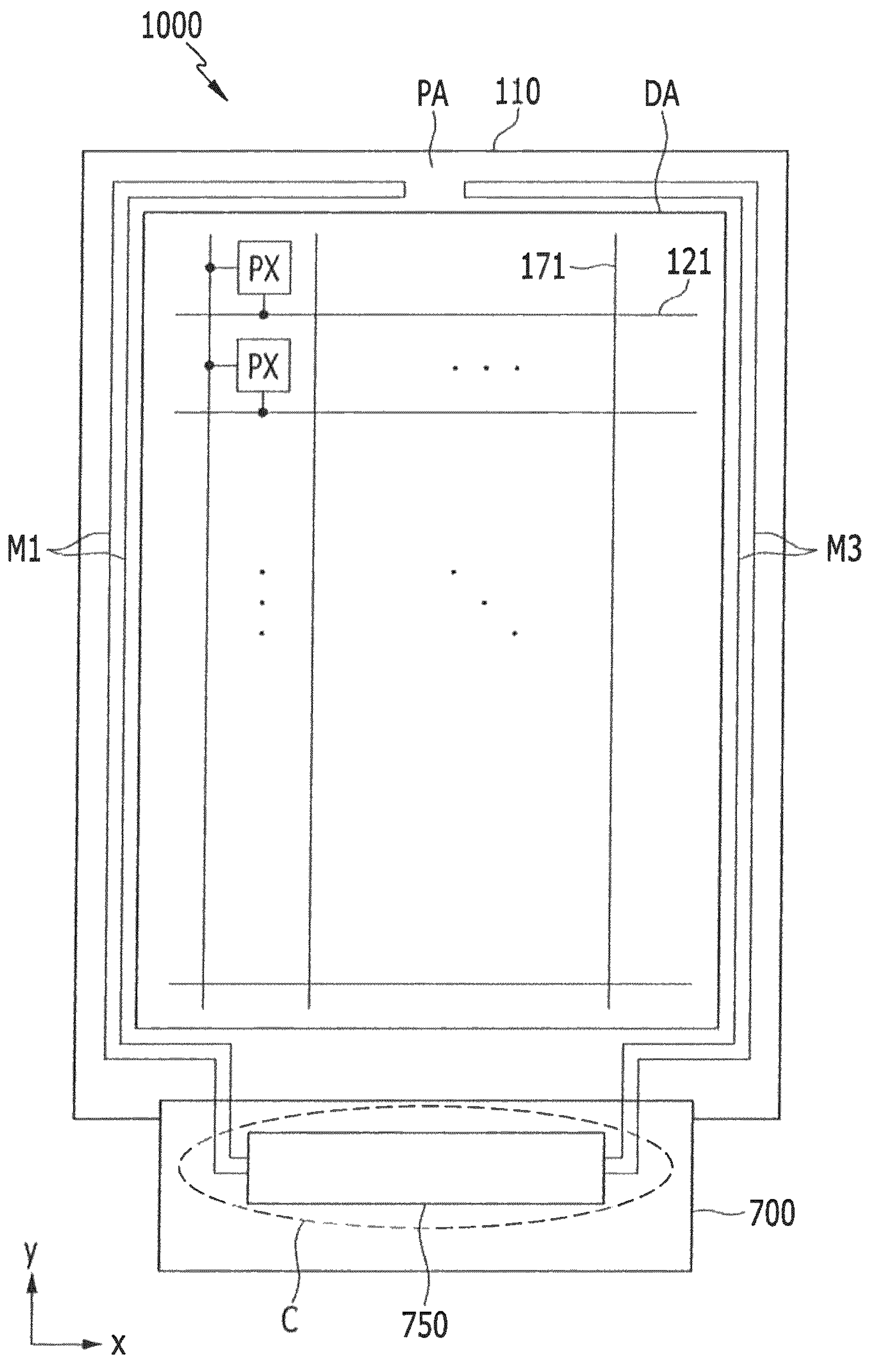
FIG. 10 is a layout view of a display device according to an exemplary embodiment.
Figure 11:
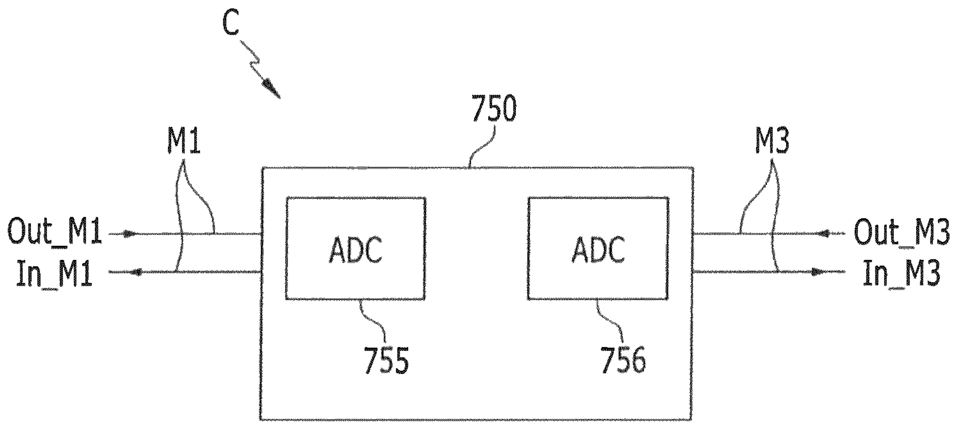
FIG. 11 is an enlarged view of a portion C in the display device of FIG. 10.

Referring to FIG. 10 and FIG. 11, a display device according to the present exemplary embodiment is similar to the display device of the above-described exemplary embodiment, except that the above-described sense wires M2 and M4 are omitted and only one sense wire (i.e., one of M1 and M3) is disposed in a peripheral area PA on one side with reference to a display area DA.

The circuit portion 750 includes at least one of resistance detectors 755 and 756. FIG. 11 shows an example in which the circuit portion 750 includes one pair of resistance detectors 755 and 756 corresponding to one pair of sense wires M1 and M3. The resistance detector 755 may detect resistance of the sense wire M1 based on an output signal Out_M1 from the sense wire M1, and the resistance detector 756 may detect resistance of the sense wire M3 based on an output signal Out_M3 from the sense wire M3. The resistance detectors 755 and 756 may each include at least one analog-to-digital converter (ADC).

A method for detecting a defect such as a crack according to the present exemplary embodiment will be described with reference to FIG. 12, together with FIG. 10 and FIG. 11. First, the circuit portion 750 inputs input signals to the sense wires M1 and M3 and receives the output signals Out_M1 and Out_M3, in response to the input signals. The circuit portion 750 determines whether the resistances of the respective sense wires M1 and M3, detected based on the output signals Out_M1 and Out_M3, are included in a first predetermined range (S121). The first predetermined range may be set to be a range such as within about ±(3, 6, 9, 12, 15, 20, 30%) with respect to a center value (e.g., about 500 kΩ, 600 kΩ, 700 kΩ, and the like) of the resistance, but the range is not limited thereto. When the resistances of the sense wires M1 and M3 are determined to be included in the first predetermined range, each wire is determined to be in a normal wire state within a process distribution range and thus the wire may be determined to be good. When one of the resistances of the sense wires M1 and M3 is determined to be outside the first predetermined range, the corresponding sense wire is determined to have a defect.

The resistances of the sense wires M1 and M3, detected by the resistance detectors 755 and 756, may be stored in a memory of the circuit portion 750 and then may be output to the outside (S122).

According to a present exemplary embodiment, resistance weight values of the sense wires M1 and M3 are applied to detect an occurrence of a crack in a digital manner using the circuit portion 750. Further, the degree of the crack may be detected by acquiring information on the progression of the crack.

Figure 12:
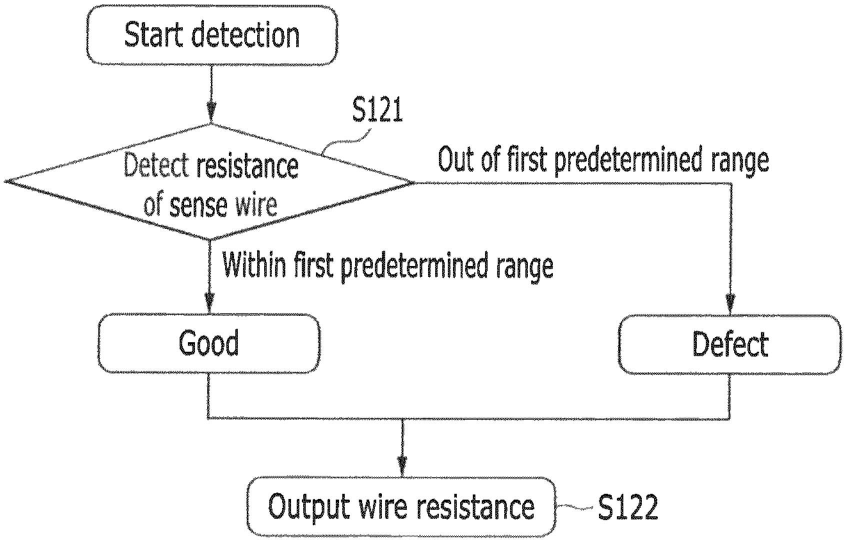
FIG. 12 is a flowchart of a method for inspecting a defect such as a crack in the display device according to an exemplary embodiment of the inventive concept.

While FIG. 12 does not illustrate the additional step of FIG. 6 for detecting a resistance comparison value by comparing resistances of the sense wires M1 and M3 with each other, in an alternate embodiment, the method of FIG. 12 may be modified to add this additional step.

Next, a display device according to an exemplary embodiment will be described with reference to FIG. 13 and FIG. 14, together with the above-described drawings.

Figure 13:
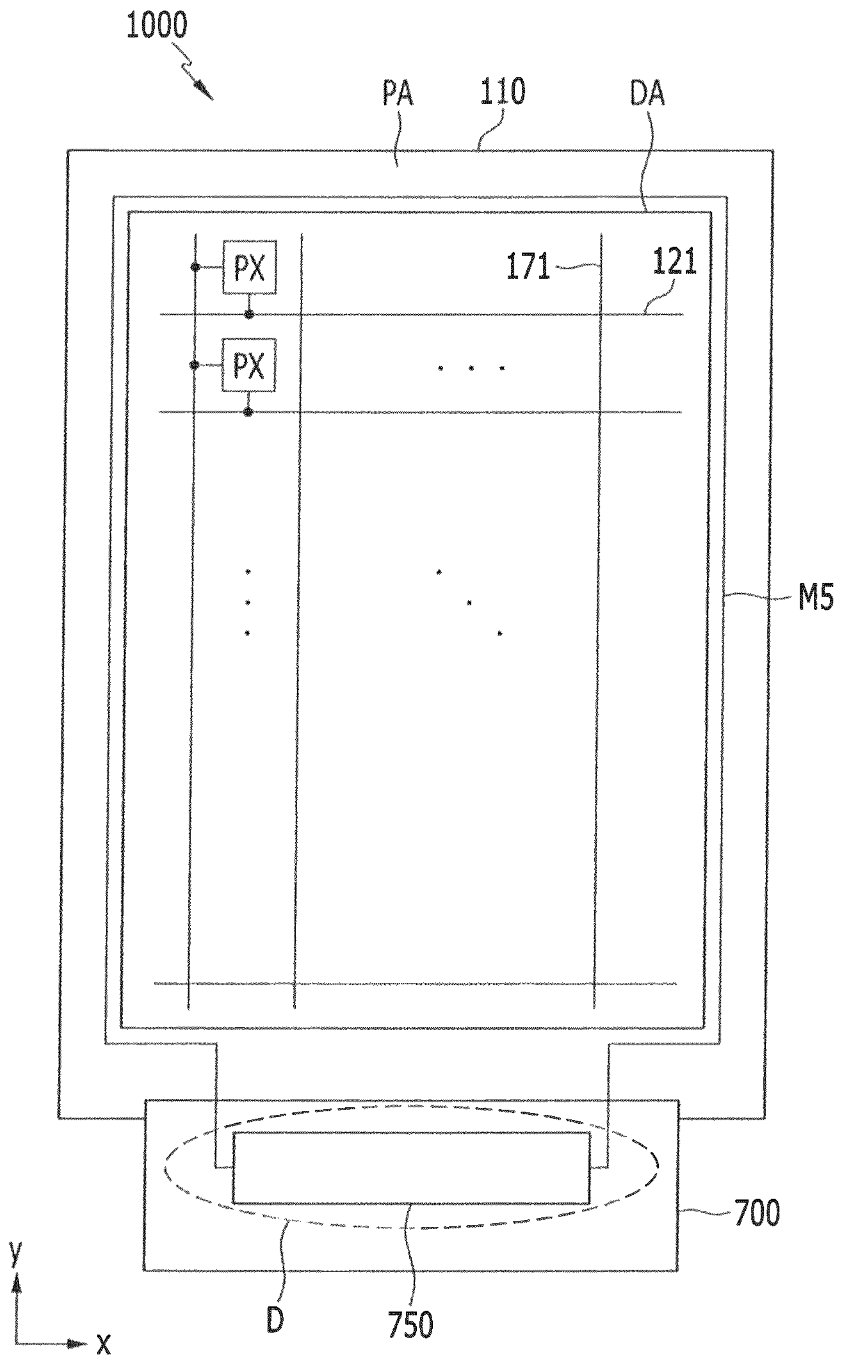
FIG. 13 is a layout view of a display device according to an exemplary embodiment of the inventive concept.
Figure 14:
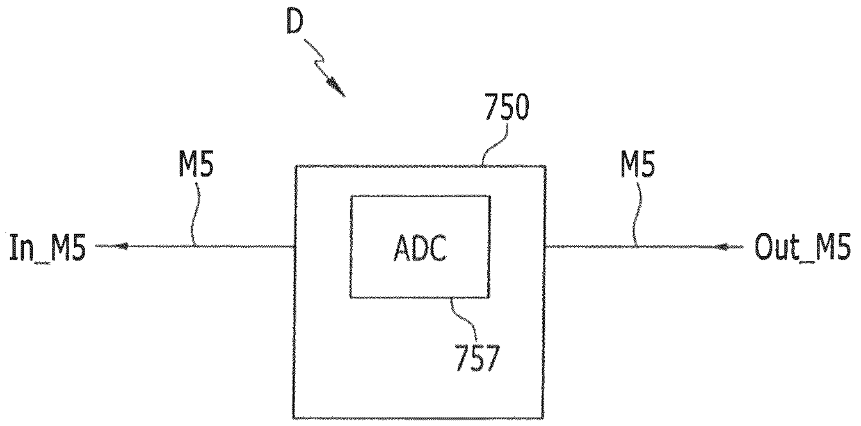
FIG. 14 is an enlarged view of a portion D of the display device of FIG. 13.

Referring to FIG. 13 and FIG. 14, a display device according to the present exemplary embodiment is similar to the display device of the exemplary embodiment of FIG. 8 and FIG. 9, except that a sense wire M6 is omitted and only a sense wire M5 that extends along the entire peripheral area PA is included.

A circuit portion 750 includes a resistance detector 757. The resistance detector 757 may detect resistance of the sense wire M5 based on an output signal Out_M5 from the sense wire M5. The resistance detector 757 may include at least one analog-to-digital converter (ADC). The ADC may be used to convert a detected analog resistance into a digital value so it can be stored in memory. The sense wire M5 may include a first portion that extends along the y direction on the right side of the peripheral area PA, a second portion connected to the first portion that extends along the x direction along a top side of the peripheral area, and a third portion connected to the second portion that extends along the y direction on the left side of the peripheral area PA.

A method for detecting a defect such as a crack according to the present exemplary embodiment may include inputting an input signal In_M5 to the sense wire M5, receiving an output signal Out_M5 in response to the input signal, and detecting resistance of the sense wire M5 based the output signal Out_M5 to determine whether the detected resistance is included in a first predetermined range. The first predetermined range may be set to be a range such as within about ±(3, 6, 9, 12, 15, 20, 30%) with respect to a center value (e.g., about 500 kΩ, 600 kΩ, 700 kΩ, and the like) of the resistance, but is not limited thereto. When the resistance of the sense wire M5 is determined to be included in the first predetermined range, the sense wire is determined to be in a normal wire state within a process distribution range and thus the wire may be determined to be good. If the resistance of the sense wire M5 is determined to be outside the first predetermined range, the corresponding sense wire is determined to have a defect.

The resistance of the sense wire M5, detected by the resistance detector 757, may be stored in a memory of the circuit portion 750 and then may be output to the outside.

A display device according to an exemplary embodiment may be various display devices such as a liquid crystal display (LCD) or an organic/inorganic light emitting display device.

While the invention has been described in connection with what is presently considered to be practical example embodiments, it is to be understood that the invention is not limited to the disclosed embodiments, but, on the contrary, is intended to cover various modifications and equivalent arrangements included within the spirit and scope of this disclosure.

What is claimed is:

1. A display device comprising:

a display panel comprising a substrate that includes a display area and a peripheral area disposed outside the display area;

a circuit in the peripheral area;

a first sense wire disposed in the peripheral area and having both ends connected to the circuit to form a first looped end at a center portion of a side of the peripheral area without extending along all sides of the peripheral area;

a second sense wire disposed in the peripheral area between the first sense wire and the display area and having both ends connected to the circuit to form a second looped end at the center portion adjacent and spaced apart from the first looped end without extending along all sides of the peripheral area; and a transistor disposed in the display area, the transistor comprising an active pattern comprising a channel region and a conductive region connected to the channel region, wherein a first conductive layer is disposed on the substrate in a cross-sectional view, the first conductive layer comprising a gate electrode of the transistor, a second conductive layer is disposed on the first conductive layer in the cross-sectional view, and a third conductive layer is disposed on the second conductive layer in the cross-sectional view, the third conductive layer comprising a conductor electrically connected to the conductive region of the active pattern, and the second conductive layer comprises the first sense wire and the second sense wire.

2. The display device of claim 1, wherein the first sense wire and the second sense wire are disposed in a same layer and are spaced apart from each other.

3. The display device of claim 2, further comprising:

a voltage transmission line disposed in the peripheral area and transmitting a common voltage, wherein the first sense wire and the second sense wire are disposed between the voltage transmission line and an edge of the substrate.

4. The display device of claim 3, wherein the voltage transmission line is disposed in the third conductive layer.

5. The display device of claim 3, wherein the first sense wire and the second sense wire are disposed in the peripheral area at a same side of the display area as the voltage transmission line.

6. The display device of claim 1, further comprising:

a dam portion disposed in the peripheral area, wherein the first sense wire and the second sense wire are disposed between the dam portion and an edge of the substrate.

7. The display device of claim 6, wherein the first sense wire and the second sense wire are disposed in the peripheral area at a same side of the display area as the dam portion.

8. The display device of claim 6, further comprising:

a pixel electrode disposed on the third conductive layer; and an insulating layer having an opening on the pixel electrode, wherein the insulating layer comprises the dam portion.

9. The display device of claim 1, wherein the second sense wire comprises a portion that extends in parallel with the first sense wire.

10. The display device of claim 1, wherein a length of the second sense wire is shorter than a length of the first sense wire.

11. The display device of claim 1, wherein each of the first sense wire and the second sense wire comprises a wire that extends back and forth at least once in the peripheral area.

12. The display device of claim 11, wherein a number of meandering paths of a meandering structure included in the second sense wire is smaller than a number of meandering paths of a meandering structure included in the first sense wire.

13. The display device of claim 12, wherein the circuit is configured to apply a weight value to compensate a difference between a resistance of the first sense wire and a resistance of the second sense wire.

14. The display device of claim 1, wherein each of the first and second sense wires includes a portion extending along at least three sides of the display area.

15. The display device of claim 1, wherein the first sense wire comprises two portions that are disposed symmetrically to each other with respect to the display area.

16. The display device of claim 1, wherein the circuit comprises a comparator.

17. The display device of claim 16, wherein the comparator compares a first output signal output from the first sense wire and a second output signal output from the second sense wire to generate a comparison result, and the circuit determines whether a defect is present in the display device based on the comparison result.

18. The display device of claim 16, wherein the circuit further comprises an analog-to-digital converter.

* * * * *